Feb. 18, 1947.　　　　　A. W. ANISH　　　　　2,415,927
METHOD OF SENSITIZING PHOTOGRAPHIC SILVER-HALIDE EMULSIONS
Original Filed Oct. 17, 1944

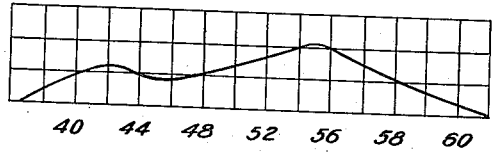

Fig. 1 — 2-[1-THIOACETYL-3-(3-ETHYL-2(3)-BENZOTHIAZOLYLIDENE)PROPENYL]BENZTHIAZOLE

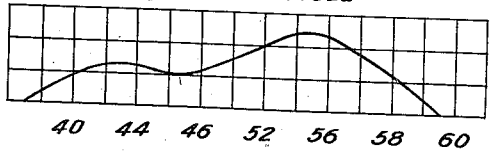

Fig. 2 — 2-[1-ETHOXALYL-3-(3-ETHYL-2(3)-BENZOTHIAZOLYLIDENE)PROPENYL]BENZTHIAZOLE

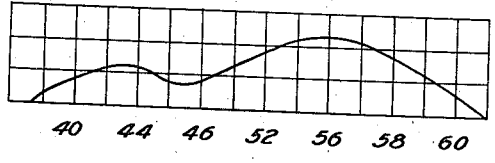

Fig. 3 — 2-[1-BENZOYL-3-(3-ETHYL-2(3)-BENZOTHIAZOLYLIDENE PROPENYL]BENZTHIAZOLE

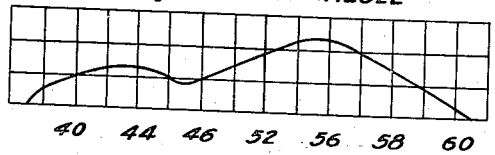

Fig. 4 — 2-[1-ETHOXALYL-3-(3ETHYL-2(3)-BENZOTHIAZOLYLIDENE)PROPENYL]-B-NAPHTHIAZOLE

Inventor:
ALFRED W. ANISH
By
Attorneys.

Patented Feb. 18, 1947

2,415,927

UNITED STATES PATENT OFFICE 2,415,927

METHOD OF SENSITIZING PHOTOGRAPHIC SILVER-HALIDE EMULSIONS

Alfred W. Anish, Johnson City, N. Y., assignor to General Aniline & Film Corporation, New York, N. Y., a corporation of Delaware Original application October 17, 1944, Serial No. 559,134. Divided and this application October 17, 1944, Serial No. 559,133

4 Claims. (Cl. 95—7)

This invention relates to new compounds for sensitizing photographic silver-halide emulsions and to a method of preparing the same. More particularly, the invention relates to new chain-substituted cyanine dye bases and salts thereof containing a carbonyl or thiocarbonyl group as a part of the chain substitution.

Sensitizing dye bases of the polymethine series which are substituted at the central carbon atom of the polymethine chain by either a thienyl, alkyl, oxalkyl, halogen, aryl, aralkyl, or acyl group are the subjects of several patents. In all of these dyes, however, the substitutions at the central carbon atom of the polymethine chain do not enter into a resonance configuration so as to act as an auxochromic group.

An object of the present invention is to provide new chain-substituted cyanine dyes and salts thereof, containing a carbonyl or thiocarbonyl group as a part of the chain substitution.

A further object is to provide a photographic element comprising an emulsion sensitized with new chain-substituted cyanine dyes and salts thereof, containing a carbonyl or thiocarbonyl group as a part of the chain substitution.

Other objects and advantages of this invention will become apparent by reference to the following specification in which its preferred details and embodiments are described.

This invention is based on the discovery that sensitizing dye bases of the polymethine series, having introduced in the alpha-carbon atom of the polymethine chain a carbonyl or thiocarbonyl group, are suitable for sensitizing photographic emulsions. In particular, they are especially useful for sensitizing silver-chloride emulsions. This latter unexpected and highly desirable property makes the sensitizing dye bases applicable to the varicontrast printing process. It is believed that the carbonyl or thiocarbonyl group enters into the resonance configuration, acting as one of the auxochromic groups.

The dye bases, which may be used as such or in the form of their quaternary ammonium salts, are prepared by condensing an omega acyl azole with a cyanine dye intermediate, and are characterized by the following general formula:

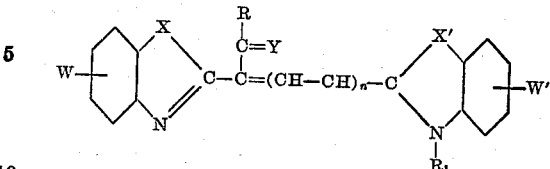

wherein R represents an alkyl, e. g., methyl, ethyl, propyl, butyl and the like, carboxyalkyl, e. g., carbomethoxy, carbethoxy, carbopropoxy and the like, alkoxy, e. g., methoxy, ethoxy, propoxy, etc., alkoxyalkyl, e. g., methoxyethyl, ethoxyethyl, ethoxypropyl, etc., aryl, e. g., phenyl, naphthyl, diphenyl, anthranyl, alkoxyaryl, e. g., methoxyphenyl, ethoxyphenyl, propoxyphenyl, methylenedioxyphenyl and the like, aralkyl, e. g., benzyl, methylbenzyl, ethylbenzyl, propylbenzyl, etc., $R_1$ represents an alkyl or alkoxyalkyl of the same value as R, W and W' are the same or different and represent hydrogen, alkyl, carboxyalkyl, alkoxy, alkoxyalkyl, aryl, substituted aryl and aralkyl groups of the same value as R, X and X' are the same or different and represent oxygen, sulfur, selenium or

wherein R' and R" may be an alkyl or an aryl group of the same value as R, and Y represents either oxygen or sulfur, and $n$ represents an integer of from one to two.

The omega acyl azoles used in the preparation of the new dyes of the present invention are described in U. S. Patents 2,166,198, 2,323,504 and 2,233,873. These compounds consist, for the most part, of one or more ring systems in each azole nucleus, which azole nucleus contains a

—CH₂CO— group directly attached to the nucleus through the methylene radical. The benzthiazole-2- pyruvic ethyl ester used in the preparation of the new dyes of the present invention is prepared according to the method of Borsche and Doeller, Liebig's Annalen des Chemie, vol. 537, pages 56–58, 1938.

The methods for the preparation of the cyanine dye intermediates, e. g., 2(β-acetanilido vinyl) cyclammonium quaternary salts are given in the literature. One general method consists of reacting a cyclammonium quaternary salt such as 2-methyl benzthiazole with an excess of diphenyl formamidine in acetic anhydride to give 2(β-acetanilido vinyl) benzthiazole.

Typical cyanine dye intermediates which can be employed in the condensation reaction with an omega acyl azole include: 2(β-acetanilido vinyl) cyclammonium quaternary salt, 2(β-anilino-β-ethyl-vinyl) cyclammonium quaternary salt, 2(4-acetanilido butadienyl) cyclammonium quaternary salt, 2(β-ethylmercapto) cyclammonium quaternary salt and 2(β-ethylmercapto-β-ethyl-vinyl) cyclammonium salt.

In preparing the novel sensitizing dyes of the present invention, 1 mol of an omega acyl azole is heated with 1 mol of a cyanine dye intermediate under reflux conditions in the presence of a basic (acid binding) condensing agent such as pyridine, methyl pyridine, dimethyl pyridine, ethyl pyridine, ethylmethyl pyridine, trimethyl pyridine, quinoline and the like, using basic catalysts such as, triethyl amine or potassium carbonate, or in the presence of an acid condensing agent such as acetic acid or acetic anhydride, etc. These condensing agents as such act as solvents for the reactants and as catalytic condensing or binding agents. In general, the amount of condensing agent used may vary within wide limits, e. g., from 1 to 25 mols. Concentrations ranging from about 1 mol to about 15 mols are preferred.

The resulting product obtained by condensing an omega acyl azole with a cyanine dye intermediate may be, if desired, quaternized according to well-known methods to give a dye salt. The dye salt thus obtained is readily converted into a different salt by treating it in solution with an aqueous solution of a salt containing the desired anion such as, for example, potassium bromide or iodide.

The diagrammatic spectrograms, constituting the accompanying drawing, illustrate the regions of the spectrum to which the various types of chain substituted cyanine dye bases and salts thereof, containing a carbonyl or thiocarbonyl group as a part of the chain substitution disclosed herein, will sensitize a gelatino silver-halide emulsion containing about 4–5% of silver-halide and the extent of the sensitization at various wavelengths.

The figures of this drawing and the various types or groups of dyes, the sensitizing properties of which they illustrate, are as follows:

Figure 1; 2-[1-thioacetyl - 3 -(3-ethyl-2(3)-benzothiazolylidene) propenyl] benzthiazole.

Figure 2; 2-[1-ethoxalyl - 3 -(3-ethyl-2(3)-benzothiazolylidene) propenyl] benzthiazole.

Figure 3; 2-[1-benzoyl-3-(3-ethyl-2(3)-benzothiazolylidene) propenyl] benzthiazole.

Figure 4; 2-[1-ethoxalyl - 3 -(3-ethyl-2(3)-benzothiazolylidene) propenyl]-β-naphthiazole.

The following examples describe in detail the methods for accomplishing the above objects, but it is to be understood that they are inserted merely for the purpose of illustrations and are not to be construed as limiting the scope of the invention.

Example I

2-[1-benzoyl-3-(3-ethyl-2(3)-benzothiazolylidene)propenyl] benzthiazole

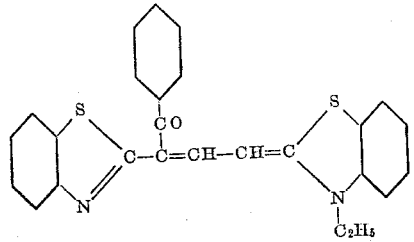

2.3 gms. of 2(β-acetanilido vinyl) benzthiazole ethiodide and 1.3 gms. of 2-phenacyl-benzthiazole were dissolved in 20.0 cc. of dry pyridine and 0.5 cc. of triethylamine added. The mixture was refluxed for 1½ hours, then water added to make it slightly cloudy. The crystals which separated out were washed with water and alcohol and finally boiled out with ethyl alcohol.

The dye sensitized a chloride emulsion rather strongly and a bromide emulsion weakly. The alcohol solution of the intermediate had an absorption maximum at about 500 mμ. An alcohol solution of 25 mg. of the dye was incorporated in 1 kilogram of silver chloride emulsion containing a small amount of silver bromide and having a total content of 4–5% silver-halide. The dye imparts a sensitivity to about 600 mμ, with a maximum sensitivity at about 550 mμ, which is flat.

Example II

2-[-1-acetyl-3-(3-ethyl-2(3)-benzothiazolylidene) propenyl] benzthiazole

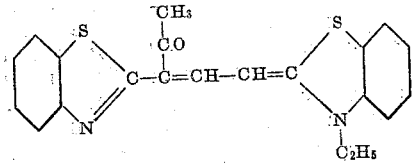

Four and one-half gms. of 2(β-acetanilido vinyl) benzthiazole ethiodide and 1.6 gms. of 2-acetonyl benzthiazole were dissolved in 40.0 cc. of dry pyridine to which 1.0 cc. of triethylamine had been added. The mixture was heated at 100° C. for 2 hours, while still warm 40 cc. of water were added and after standing dye crystals separated. The dye base was filtered off and washed with dilute alcohol. It was further purified by boiling out with ethyl alcohol.

The alcohol solution of the intermediate had an absorption maximum at about 510 mμ. An alcohol solution of 30 mg. of the dye was incorporated in 1 kilogram of silver chloride emulsion containing a small amount of silver bromide and having a total content of 4–5% silver-halide. The dye imparts a sensitivity to about 600 mμ, with a maximum sensitivity at about 560 mμ, which is flat.

Example III

2-[1-acetyl-5-(3-ethyl-2(3)-benzothiazolylidene-1,3-pentadienyl] benzthiazole

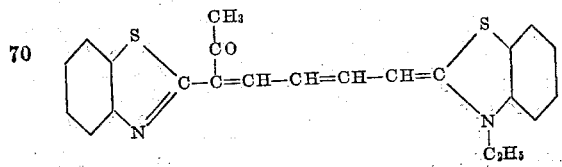

0.9 gm. of Δ^{1,3} acetbutadienyl benzthiazole ethiodide and 0.9 gm. of 2-acetonyl benzthiazole were dissolved in 15.0 cc. of dry pyridine and 0.5 cc. of triethylamine added. The mixture stood at room temperature for 3 to 4 hours. The reaction was then completed by heating at 50–60° C. for 2 hours. The dye was precipitated with water and filtered after standing another 3–4 hours. The filter residue was taken up in dioxane and diluted with ethyl alcohol. The pure dye separated on standing. The dye sensitized a chloride emulsion rather strongly and a bromide emulsion weakly.

The alcohol solution of the dye had an absorption maximum at about 560 mμ. An alcohol solution of 40 mg. of the dye was incorporated in 1 kilogram of silver chloride emulsion containing a small amount of silver bromide and having a total content of 4–5% silver-halide. The dye imparts a sensitivity to about 680 mμ, with a maximum sensitivity at about 630 mμ, which is flat.

*Example IV*

2-[1-(4)-methoxybenzoyl-3-(3-ethyl-2(3)-benzothiazolylidene) propenyl] benzthiazole

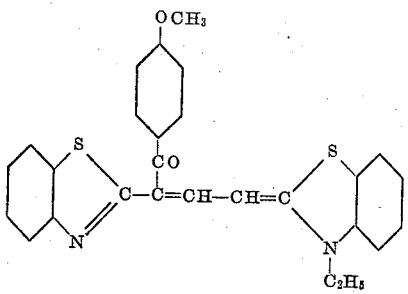

1.1 gms. of 2(β-acetanilido vinyl) benzthiazole ethiodide and 0.7 gm. of 2(p-methoxybenzoyl) were dissolved in 10.0 cc. of dry pyridine and 1.0 cc. of triethylamine added. The mixture was heated at 100° C. for 2½ hours, then cooled and diluted out with water. The crystals which separated were filtered, washed with water and crystallized from ethyl alcohol in two fractions. The more insoluble portion contained the pure dye.

The alcohol solution of the dye had an absorption maximum at about 500 mμ. An alcohol solution of 30 mg. of the dye was incorporated in 1 kilogram of silver chloride emulsion containing a small amount of silver bromide and having a total content of 4–5% silver-halide. The dye imparts a sensitivity to about 600 mμ, with a maximum sensitivity at about 540 mμ, which is flat.

*Example V*

2-[1-(3,4)-methylenedioxybenzoyl-3-(3-ethyl-2(3)-benzothiazolylidene propenyl] benzthiazole

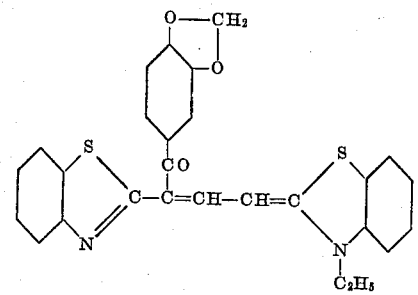

0.5 gm. of 2(β-acetanilido vinyl) benzthiazole ethiodide and 0.3 gm. of 3,4 methylenedioxy- benzoyl ethyl acetate were dissolved in 10.0 cc. of dry pyridine and 0.25 cc. of triethylamine added. The mixture was refluxed for 10–15 minutes, cooled and water added. After standing for several hours, crystals separated out. The crude dye was recrystallized from ethyl alcohol in two fractions. The pure dye was contained in the more insoluble fraction.

The alcohol solution of the dye had an absorption maximum at about 500 mμ. An alcohol solution of 40 mg. of the dye was incorporated in 1 kilogram of silver chloride emulsion containing a small amount of silver bromide and having a total content of 4–5% silver-halide. The dye imparts a sensitivity to about 600 mμ, with a maximum sensitivity at about 540 mμ, which is flat.

*Example VI*

2-[1-acetyl-3-(3-ethyl-2(3)-benzothiazolylidene)propenyl] benzoxazole

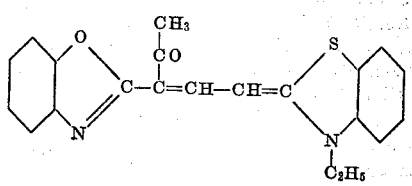

4.5 gms. of 2(β-acetanilido vinyl) benzthiazole ethiodide and 2.0 gms. of 2-acetonyl benzoxazole were dissolved in 30 cc. of dry pyridine and 1.0 cc. of triethylamine added. The mixture was refluxed for 20 minutes and then diluted with water. The crystals which separated out were filtered off, washed with water and recrystallized in two fractions from ethyl alcohol.

The alcohol solution of the dye had an absorption maximum at about 500 mμ. An alcohol solution of 40 mg. of the dye was incorporated in 1 kilogram of silver chloride emulsion containing a small amount of silver bromide and having a total content of 4–5% silver halide. The dye imparts a sensitivity to about 600 mμ, with a maximum sensitivity at about 540 mμ, which is flat.

*Example VII*

2-[1-acetyl-3-(3-ethyl-5,6-dimethyl-2(3)-benzoxazolylidene)propenyl] benzthiazole

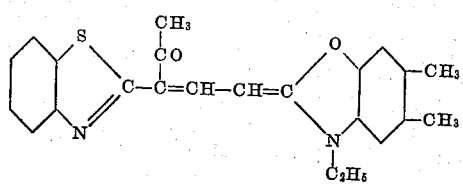

2.0 gms. of 2-acetonyl benzthiazole, and 5.0 gms. of 2(β-acetanilido vinyl) 5,6-dimethyl benzoxazole ethiodide were dissolved in 30.0 cc. of dry pyridine and 2.0 cc. of triethylamine added. The mixture was refluxed for 20 minutes and water added while still hot. On standing, crystals separated which were filtered off, washed with water and then recrystallized from methanol.

The alcohol solution of the dye had an absorption maximum at about 500 mμ. An alcohol solution of 25 mg. of the dye was incorporated in 1 kilogram of silver chloride emulsion containing a small amount of silver bromide and having a total content of 4–5% silver halide. The dye imparts a sensitivity to about 600 mμ, with a maximum sensitivity at about 550 mμ, which is flat.

Example VIII

2-[1-acetyl-3-(3-ethyl-5-ethoxy-2(3)-benzselenazo-lylidene) propenyl] benzthiazole

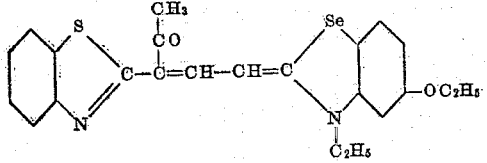

2.0 gms. of 2-acetonyl benzthiazole and 5.0 gms. of 2(β-acetanilido vinyl)-6-ethoxy-benzselenazole ethiodide were dissolved in 30.0 cc. of dry pyridine and 2.0 cc. of triethylamine added. The mixture was refluxed for 20 minutes and water added while still hot. The crystals which separated on standing were filtered off, washed with water and recrystallized in two parts from methanol.

The alcohol solution of the dye had an absorption maximum at about 590 m$\mu$. An alcohol solution of 25 mg. of the dye was incorporated in 1 kilogram of silver chloride emulsion containing a small amount of silver bromide and having a total content of 4-5% silver halide. The dye imparts a sensitivity to about 690 m$\mu$, with a maximum sensitivity at about 640 m$\mu$, which is flat.

Example IX

2-[1-acetyl-3-(3-ethyl-6-methoxy-2(3)-benzothiazolylidene) propenyl] benzthiazole

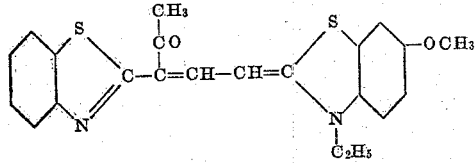

One gram of 2(β-acetanilido vinyl)-6-methoxy-benzthiazole ethiodide and 0.4 gm. of 2-acetonyl benzthiazole were dissolved in 20.0 cc. of dry pyridine and 0.5 cc. of triethylamine added. The mixture was refluxed for 1 hour and water added. The dye crystals which separated on standing were washed with water, dissolved in hot dioxane and diluted out with methyl alcohol. The crystals which separated were washed with water and boiled out with ethyl alcohol.

The alcohol solution of the dye had an absorption maximum at about 500 m$\mu$. An alcohol solution of 30 mg. of the dye was incorporated in 1 kilogram of silver chloride emulsion containing a small amount of silver bromide and having a total content of 4-5% silver halide. The dye imparts a sensitivity to about 600 m$\mu$, with a maximum sensitivity at about 590 m$\mu$, which is flat.

Example X

2-[1-acetyl-3-(1-ethyl-3,3,5-trimethyl-2(3)-indoleninylidene) propenyl] benzthiazole

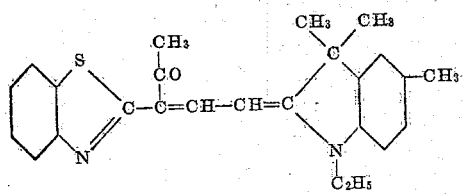

5.0 gms. of 1-ethyl-2-formylmethylene-3,3,5-trimethyl indolenine and 4.0 gms. of 2-acetonyl benzthiazole were dissolved in 50.0 cc. of acetic anhydride. The mixture was heated to 140° C. for 1 hour, cooled and diluted with acetic acid. The dye was precipitated from the acid solution with water and the dye crystals purified from methyl alcohol.

The alcohol solution of the dye had an absorption maximum at about 500 m$\mu$. An alcohol solution of 40 mg. of the dye was incorporated in 1 kilogram of silver chloride emulsion containing a small amount of silver bromide and having a total content of 4-5% silver-halide. The dye imparts a sensitivity to about 560 m$\mu$, with a maximum sensitivity at about 530 m$\mu$, which is flat.

Example XI

2-[-1-acetyl-3-(3-ethyl-2(3)-benzothiazolylidene) propenyl]-3-ethyl benzthiazole iodide

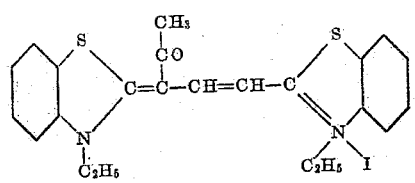

3.5 gms. of 2-acetonyl benzthiazole ethiodide was mixed with 4.5 gms. of 2(β-acetanilido vinyl) benzthiazole ethiodide, and 30.0 cc. of dry pyridine and 1.0 cc. of triethylamine added. The mixture was refluxed for 20 minutes and the dye precipitated with water. The dye crystals were filtered off and recrystallized from ethyl alcohol.

The alcohol solution of the dye salt had an absorption maximum at about 570 m$\mu$. An alcohol solution of 30 mg. of the dye was incorporated in 1 kilogram of silver chloride emulsion containing a small amount of silver bromide and having a total content of 4-5% silver-halide. The dye imparts a sensitivity to about 640 m$\mu$, with a maximum sensitivity at about 610 m$\mu$, which is flat.

While the above example has been described particularly with reference to the preparation of a dye salt, it will be understood that the dye bases in the preceding and subsequent examples may also be transformed into dye salts by methods known to the art. The dye salts, however, show a bathochromic shift under the same conditions of application over the dye bases from which they are derived.

Example XII

2-[1-ethoxalyl-3-(3-ethyl-2(3)-benzothiazolylidene) propenyl] benzthiazole

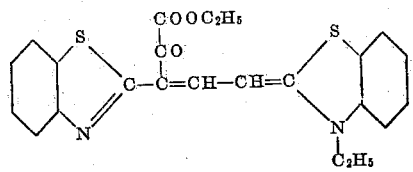

1 gram each of benzthiazole 2-pyruvic acid ethyl ester and 2(β-acetanilido vinyl) benzthiazole ethiodide were mixed in 15.0 cc. of dry pyridine and 4-5 drops of triethylamine added. The mixture was refluxed on an oil bath for 30 minutes, cooled and water added until slightly cloudy. The filtered dye crystals were washed with water and recrystallized from ethyl alcohol.

The alcohol solution of the dye had an absorption maximum at about 500 m$\mu$. An alcohol solution of 40 mg. of the dye was incorporated in 1 kilogram of silver chloride emulsion containing a small amount of silver bromide and having a total content of 4-5% silver-halide. The dye imparts a sensitivity to about 590 m$\mu$, with a maximum sensitivity at about 540 mμ, which is flat.

*Example XIII*

2-[1-ethoxalyl-3-(3-ethyl-2(3)-benzothiazolylidene)propenyl]-β-naphthiazole

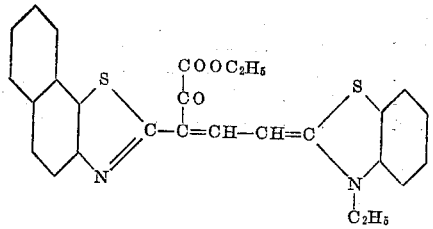

1 gram each of β-naphthiazole 2-pyruvic acid ethyl ester and 2(β-acetanilido vinyl) benzthiazole ethiodide were dissolved in 15.0 cc. of dry pyridine and 0.5 cc. of triethylamine added. The mixture was refluxed for 30 minutes, cooled and diluted out with water. The crystals which separated were filtered and washed several times with alcohol and boiled out twice with methanol.

The alcohol solution of the dye had an absorption maximum at about 500 mμ. An alcohol solution of 30 mg. of the dye was incorporated in 1 kilogram of silver chloride emulsion containing a small amount of silver bromide and having a total content of 4–5% silver-halide. The dye imparts a sensitivity to about 600 mμ, with a maximum sensitivity at about 500 mμ, which is flat.

*Example XIV*

2-[1-thioacetyl-3-(3-ethyl-2(3)-benzothiazolylidene) propenyl] benzthiazole

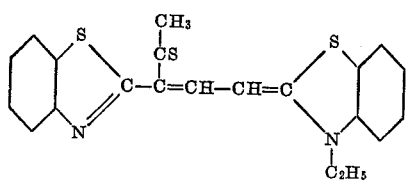

One gram of 2-thioacetonyl benzthiazole, prepared by fusing 2-acetonyl benzthiazole with phosphorus pentasulfide at 120° C., was heated at 100° C. with 1.4 gms. of 2-β-acetanilido vinyl benzthiazole in 10.0 cc. of dry pyridine and 1.0 cc. of triethylamine for 1½ hours. The reaction mixture was diluted out with 20 cc. of water and on standing crystals of dye separated out. These crystals were filtered off and dissolved in 10 cc. of dioxane and then diluted with 30 cc. of ethyl alcohol. Twenty cc. of water was added and on standing the dye separated out as brown-red crystals.

The alcohol solution of the dye had an absorption maximum at about 510 mμ. An alcohol solution of 25 mg. of the dye was incorporated in 1 kilogram of silver chloride emulsion containing a small amount of silver bromide and having a total content of 4–5% silver-halide. The dye imparts a sensitivity to about 600 mμ, with a maximum sensitivity at about 560 mμ, which is flat.

In the preparation of emulsions containing these chain substituted cyanine dye bases and dyes, the base or dye may be dissolved in methyl or ethyl alcohol and a volume solution containing from 5 to 50 milligrams of the dye base or dye added to a liter of emulsion. While in general practice it may not be necessary to add the dye base or dye in the amounts larger than those above given, generally, for satisfactory results, amounts usually ranging from 5 to 25 milligrams are sufficient to obtain the maximum sensitizing effect. However, I do not wish to limit my invention to the quantities just indicated, the most suitable amount will in each case be found by a few comparative experiments. The dye bases or dyes may be added to the emulsions in form of solutions. Suitable solvents as indicated in the examples are the alcohols, for instance, methyl or ethyl alcohol, which may be anhydrous or diluted with a small volume of water. In actual practice, the dye bases and dyes are applied to the emulsion during any stage of its production, however, they are preferably added to the finished emulsion before being cast.

It will be understood that where in the claims appended hereto the term dye is used, that such is intended to include the dye salt.

This application is a division of my co-pending application Serial No. 559,134, filed on even date.

While there have been pointed out above certain preferred embodiments of the invention, the same is not limited to the foregoing examples, illustrations, or to the specific details given therein, but is capable of variations and modifications as to the reactants, proportions and conditions employed. Accordingly, it is intended that the invention be defined only by the accompanying claims in which it is intended to include all features of patentable novelty residing therein.

I claim:

1. A photographic gelatino-silver-halide emulsion which contains a compound selected from the group consisting of compounds of the general formula:

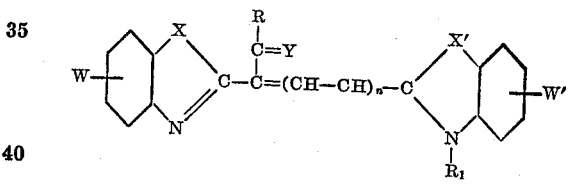

and the quaternary ammonium salts thereof, wherein R represents a member selected from the class consisting of alkyl, alkoxy, alkoxyalkyl, carboxyalkyl, aryl, aralkyl and alkoxyaryl radicals, $R_1$ represents a member selected from the class consisting of alkyl and alkoxyalkyl radicals, W and W′ are substituents selected from the class consisting of hydrogen and radicals of the same value as R, X represents a member selected from the class consisting of oxygen, sulfur and selenium, X′ represents a member selected from the class consisting of oxygen, sulfur, selenium and

where R′ and R″ is a member selected from the class consisting of alkyl and aryl radicals, Y represents a member selected from the class consisting of oxygen and sulfur and n is an integer of from one to two.

2. A photographic gelatino-silver-halide emulsion which contains a cyanine dye of the following structure:

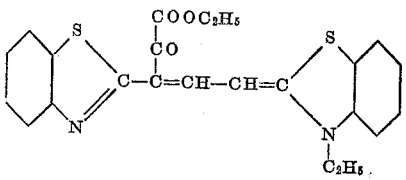

3. A photographic gelatino-silver-halide emulsion which contains a cyanine dye of the following structure:
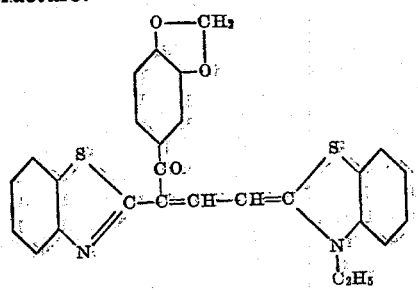
4. A photographic gelatino-silver-halide emulsion which contains a cyanine dye salt of the following structure:
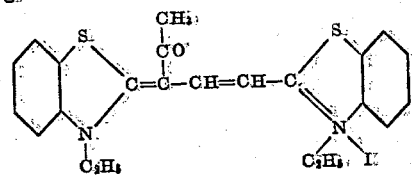
ALFRED W. ANISH.
REFERENCES CITED
The following references are of record in the file of this patent:
UNITED STATES PATENTS
| Number | Name | Date |
|---|---|---|
| 2,158,287 | Konig | May 16, 1939 |
| 2,169,434 | Schwarz | Aug. 15, 1939 |
| 2,345,094 | Brooker et al. | Mar. 28, 1944 |
| 1,942,854 | Brooker | Jan. 9, 1934 |